US010372461B2

(12) United States Patent
Araki et al.

(10) Patent No.: US 10,372,461 B2
(45) Date of Patent: Aug. 6, 2019

(54) DEVICE DRIVER REGISTRATION DEVICE AND DEVICE DRIVER REGISTRATION METHOD USING SAME

(71) Applicants: ALAB INC., Tokyo (JP); KONAMI DIGITAL ENTERTAINMENT CO., LTD., Tokyo (JP)

(72) Inventors: Masayuki Araki, Tokyo (JP); Hajime Takahama, Tokyo (JP)

(73) Assignee: ALAB INC., Tokyo (JP)

(*) Notice: Subject to any disclaimer, the term of this patent is extended or adjusted under 35 U.S.C. 154(b) by 214 days.

(21) Appl. No.: 15/512,810

(22) PCT Filed: Aug. 31, 2015

(86) PCT No.: PCT/JP2015/074780
§ 371 (c)(1),
(2) Date: Mar. 20, 2017

(87) PCT Pub. No.: WO2016/043040
PCT Pub. Date: Mar. 24, 2016

(65) Prior Publication Data
US 2017/0286124 A1    Oct. 5, 2017

(30) Foreign Application Priority Data
Sep. 19, 2014 (JP) .................. 2014-191562

(51) Int. Cl.
*G06F 9/44* (2018.01)
*G06F 9/4401* (2018.01)
*G06F 9/445* (2018.01)

(52) U.S. Cl.
CPC .......... *G06F 9/4406* (2013.01); *G06F 9/4411* (2013.01); *G06F 9/44521* (2013.01)

(58) Field of Classification Search
CPC .... G06F 9/44502; G06F 9/44508; G06F 1/24; G06F 9/44526; G06F 15/177;
(Continued)

(56) References Cited

U.S. PATENT DOCUMENTS

2010/0178066 A1* 7/2010 Asahara ................ G06F 3/1203
399/12
2013/0263159 A1* 10/2013 Yamanaka ............ G06F 13/102
719/321

FOREIGN PATENT DOCUMENTS

JP    H1011384 A    1/1998
JP    2004070964 A    3/2004
JP    2007265064 A    10/2007

* cited by examiner

Primary Examiner — Zahid Choudhury
(74) Attorney, Agent, or Firm — AEON Law, PLLC; Adam L.K. Philipp; David V.H. Cohen

(57) ABSTRACT

[Problem to be Solved] To register a device driver in the kernel of an operating system by means of a method simpler than conventional methods.
[Solution] The device driver is registered in an operating system kernel using a notification driver, which is provided with a driver interface for notifying the operating system kernel of device setting information, and a scenario sequence file, in which device setting information is described which includes device parameters, including configuration structure information about the device, and an execution script for determining the operations of the device. By loading the scenario sequence file into the notification driver, the device driver is registered in the operating system kernel by means of the device interface.

9 Claims, 5 Drawing Sheets

(58) Field of Classification Search
CPC .............. G06F 9/44514; G06F 9/44523; G06F 11/1417; G06F 9/44505
See application file for complete search history.

DEVICE DRIVER REGISTRATION DEVICE AND DEVICE DRIVER REGISTRATION METHOD USING SAME

TECHNICAL FIELD

The present invention relates to a device-driver registration device, and a registration method of the device-driver using the same.

BACKGROUND ART

In order to connect a computer, such as a personal computer or a smartphone, to peripheral equipment (hereinafter referred to as "a device") and use the device, not only physical connection of the computer and the device, but also "logical connection", in which a device-driver enables the computer to recognize the device and enable the computer and device to communicate with each other, are required.

The device-driver is typically produced by the device maker as a program exclusively for each combination of a device and Operating System (OS) and is provided together with the device to users. Such a form of providing the device-driver is used mainly because each device is produced based on a specific standard and specification and additionally the device-driver depend on not only the device but also the OS.

CITATION LIST

Patent Literature

Patent Literature 1: Japanese Unexamined Patent Application Publication No. H10-011384
Patent Literature 2: Japanese Unexamined Patent Application Publication No. 2004-070964

SUMMARY OF INVENTION

Technical Problem

The device-driver may be a program to be designed based on a specific standard and specification for each device, and in short, it is a program for registering information concerning the device's hardware, such as parameters and connection forms, into an operating system ("OS") kernel. The information is necessary for constitution (configuration) or settings of the device. Most of the information contained in a device-driver concerns the device's hardware, while only some is specific to the OS. For example, for an interface function (referred to hereinafter as "a driver-interface" in the description) between the OS and the device-driver, a method or a form for calling the driver-interface is OS-specific. Furthermore, installation of the device-driver essentially needs administrator rights of the OS.

For some devices, device setting-information, which should be held in the device's device-driver, may be very great in numbers, and fine adjustment corresponding to the characteristics of the device may be required. However, even if just a small change of the configuration for the adjustment is desired, the device maker shall generate (program) the device setting-information from the beginning and the users of the computer cannot even modify any afterward.

Once a device-driver has been generated, the device setting-information defined inside the device-driver cannot be changed. When the source code is programmed in programming languages, such as C, the executable program file needs to be generated by rewriting the source code and compiling it again and to be delivered to users. For development of device-drivers, the work requires much labor.

The present invention is made in view of the foregoing, and an object of the present invention is to provide a new framework for registering a device-driver into an OS kernel in an easier way compared with conventional ways.

Solution to Problem

A registration method of a device-driver according to embodiments of the present invention is
to prepare
a notification driver, which is provided with a driver-interface for notifying an OS kernel of device setting-information, and
a scenario sequence file in which the device setting-information is described, and
to register the device setting-information into the kernel via the driver-interface by reading the scenario sequence file into the notification driver.

The notification driver in the above configuration only functions as an interface to notify the OS of the device setting-information. Accordingly, the notification driver does not include any device-dependent information. The notification driver does not independently function as a device-driver in any way. The notification driver consists only of an OS-dependent driver-interface, and can be commonly used for all devices. When the notification driver receives device setting-information from the device, the notification driver can immediately notify the OS kernel of the device setting-information. For this disclosure, examples of such device setting-information include setting-information for controlling devices, setting-information to be set in the device (parameters, etc. to be provided to the devices), and execution scripts that determine device operations.

After the kernel reads (loads) the notification driver, the scenario sequence file is read into the notification driver during initialization of the device. Consequently, all the device setting-information required for the device operation can be registered into the kernel at anytime.

Such a framework enables device providers to improve the development efficiency in device-drivers and greatly simplify the work of device driver developers, such as changing configurations and adjusting (tuning) set values.

Advantageous Effects of Invention

According to the registration method of the device-driver of the present invention, the device-driver corresponding to each device being connected can be registered (generated) in the computer simply by loading the notification driver into the kernel and reading the scenario sequence file via the notification driver during the initialization of the driver. Therefore, the device-driver can be registered in the OS kernel in an easier way compared with the conventional ways.

DESCRIPTION OF EMBODIMENTS

Embodiments of the present invention will be described below with reference to drawings. The same or similar members are identified with the same symbols or the same symbols having different subscripts, their description is not repeated, the description of the embodiments should be interpreted in order to understand the technical ideas of the present invention, and the description of the embodiments should not be interpreted so as to be limited.

(First Embodiment)—Basic Configuration of Device-Driver

Figure 1:
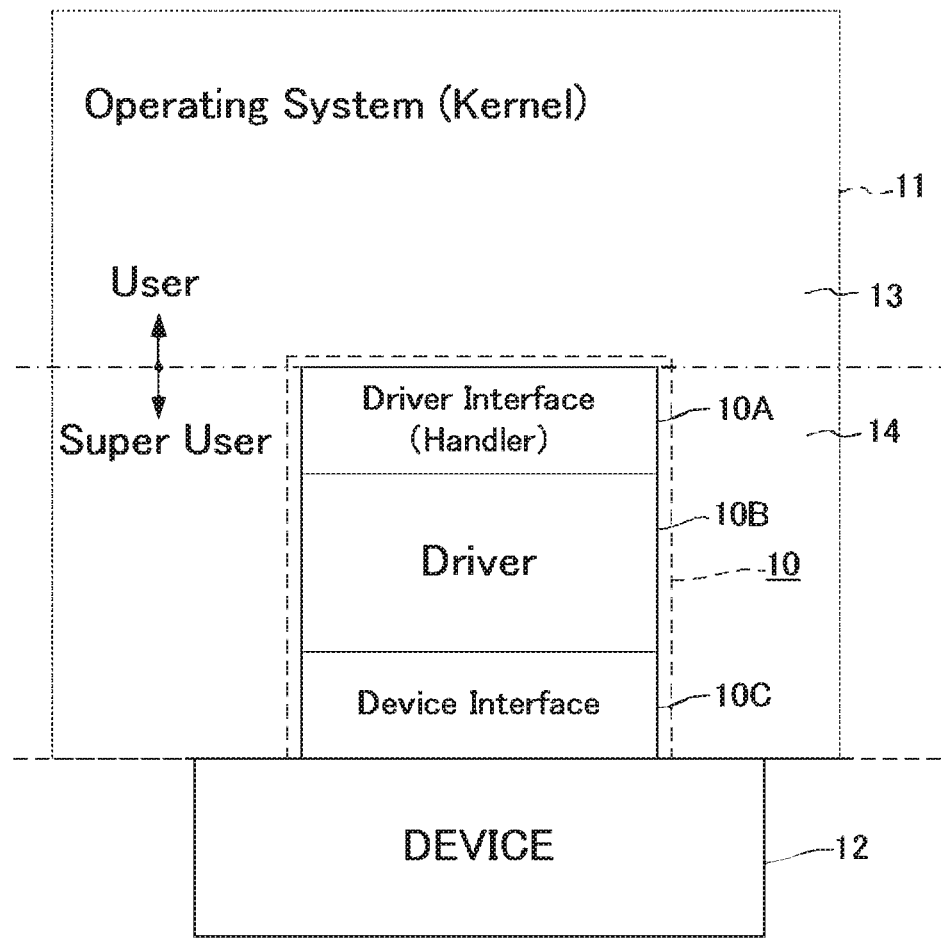
FIG. 1 is a schematic diagram showing a basic configuration of a device-driver.

FIG. 1 is a schematic diagram showing a basic configuration of a device-driver. A device-driver 10 is a program situated between the OS kernel 11 and a device 12, and the basic configuration includes three following parts:

(a) driver-interface 10A;
(b) device-driver body 10B; and
(c) device-interface 10C.

Although there are quite a wide variety of devices, a device-driver for any such device basically has the configuration shown in FIG. 1. An area on the further side of the driver-interface 10A (seen from the device 12) is an area operable by users (a user area 13), and the other area on the near side of the driver-interface 10A (seen from the device 12) is an area operated with administrator rights (an administrator area 14).

For the conventional device-drivers, all of (a) to (c) may be produced as one program by device makers and delivered to users, but the device-driver according to the embodiments employs a configuration that separates the device-driver into a program that conducts functions of driver-interface 10A and a file where the device setting-information required for the operation of device-driver body 10B and device-interface 10C is described.

(a) Driver-Interface

Although the driver-interface is an interface situated on the border between the OS and the device-driver and it is basically different for each OS, each function is the same and not OS-dependent. Examples of main features (functions) of the driver-interface are followings.

1. Initialization (initialize the device)
2. Open (open the device)
3. Close (close the device)
4. Read (read commands or data from the device)
5. Write (write commands or data into the device)
6. I/O Control (control non-standardized devices)

A device handler (hereinafter referred to as "a handler") conducts the interface functions between the device and the kernel. The handler is one of the programs deployed on a computer memory that the kernel manages. The handler is a sub-routine program that is usually in a standby state but that is called when a specified processing request (event or interrupt) is generated. For registering driver configuration information into the kernel, the various types of device configuration information, which the device-driver 10B holds, is provided to the kernel using this handler.

Although the driver-interface 10A is OS-dependent, once the driver-interface 10A is created for implementing the device-driver corresponding to a certain OS, the driver-interface 10A will remain the same as long as the microprocessor unit (MPU), which operates the OS and the kernel, is not changed. On the other hand, since both of the device-driver body 10B and device-interface 10C described below are device-configuration-dependent, they are common regardless of the OS if the device or the connection method (interface with the device) is the same. Compared with the entire device-driver 10, the driver-interface 10A is only a small part of device-driver 10.

(b) Device-Interface

The device-interface is an interface with devices for the OS kernel, and includes two types of interfaces (physical interface and logical interface). The physical interface is a portion of the device-interface for handling a physical connection form (connection problem) with hardware. With the physical interface, registers of the device to be registered are deployed on a memory map of the kernel. The physical interface is provided with a bus connection to handle memory sharing and interruption processing, and examples of physical interfaces for communication include a memory mapped register (PCI bus connection), and communication-type register (I2C (Inter-Integrated Circuit) bus interface or SPI (Serial Peripheral Interface), etc.) bus interface, depending on the connection form of the device.

On the other hand, the logical interface is an interface that represents and controls the behavior of the device via batch data (protocol packet data) according to a predetermined protocol, such as string of letters, and binary streams. "Device-interface" means one or both of the physical interface and the logical interface, depending on the context.

The device-interface also includes interruption lines for transmitting and receiving interruption signals. The interruption processing has a role of controlling condition changes of the device, using a registration type handler. If the device is a camera module as an example, a "pressing down a shutter" event is handled with the interruption processing. When the shutter is pressed down, an interruption handler is called from the kernel and consequently the corresponding function (subroutine) is read in.

(c) Device-Driver Body

The device-driver body 10B according to the embodiments mainly includes the following setting-information.

1. Setting-information for controlling devices
2. Setting-information to be set to devices (parameters, etc. to be given to devices)

"Device setting-information" in the description includes both of the above mentioned "1. Setting-information for controlling devices" and "2. Setting information to be set to devices". The setting-information includes not only data but also commands. Examples of such commands (instructions) that can be described in script include interruption waiting, substitution to registers, instruction of DMA transfer, communication via I2C/SPI bus, and write or read into/from memory mapped register.

"Control of the device" means a control relating to basic behaviors of the device, and includes the control executed with administrator rights, such as resetting of device and changing device settings. Additionally, the parameters to be set to the device are parameters for controlling depending on use purpose or use condition of the device, and the parameters are set by users. Examples of behaviors controlled by the parameters include changing a printer paper source and setting the mode of a camera (for example, switching a panorama mode, a moving picture mode, or a still picture mode depending on the occasion, with the same sensor and lens), with the same connection form and printer. Some device behaviors controlled by the parameters cannot be detected electrically at all by the device (except special cases). Since the device-driver body is essentially device-dependent, the device-driver body is determined based on the information provided from the device maker.

As described above, the device-driver body, which is the core of the device-driver, holds various device-specific setting-information, such as various parameters of the device, and commands to driver-interface 10A or device-interface 10C. This content of the device-driver body depends in large part on the device (hardware), but hardly depends on the OS. However, the conventional device-driver is OS-dependent as a whole, because even though the most part of the configuration of the conventional device-driver is determined depending on the device or the connection form, some part of the configuration is OS-dependent.

On the other hand, the device-driver according to the embodiments is configured:

to provide one "notification driver," which functions only as "(a) driver-interface" (OS-dependent), per OS, and to start first loading the notification driver into the kernel, and then reading the device setting-information not depending on the OS (but depending on the device) into the kernel via the "notification driver" during initialization of the device. It permits the user to freely rewrite the device setting-information with user-rights after the device-driver has been produced.

As described above, the sequence of the features (sequence of the registers) is determined before the main thread, by reading the device setting-information during the initialization of the device. This is because it takes time to intend to determine the sequence during runtime. Since the behavior caused by writing into the register depends on the manufacturer, the behavior often differs, but the needs of users are the same and the functionality implemented is usually about the same even though the sequences of the registers are different.

Examples of camera modules are as follows:
Camera A
Register #1. Zoom
Register #2. Focus
Camera B
Register #1. Focus
Register #2. Zoom Even if the sequences of the registers differ as described above, the sequences of the registers is simply changed by altering the parameter defined according to the device setting-information, and it enables Camera A and Camera B to implement the same functionality.

A device operation of the device-driver of the present invention can be registered by loading the "notification driver for the device setting-information," which is not device specific, into the kernel, by reading the device setting-information into the notification driver during the initialization of the device, and by notifying the kernel of the device setting-information via the notification driver.

The notification driver is may, for example, be written (programmed) in C, etc., and once the notification driver has been written, the same notification driver can be used repeatedly as long as the OS and microprocessor unit remain the same.

According to the embodiments of the present invention, the device setting-information is described in a script format file called "scenario sequence file". When the notification driver is loaded and the device is initialized, the scenario sequence file where the device setting-information is described, such as "microphone device that communicates music information via I2C interface," is read and it enables OS users to recognize that the device is a microphone device. This scenario sequence file depends on the device, but does not depend on the OS.

Consequently, even if required function is dispatched each time the device is initialized, the memory amounts occupied when the device setting-information is registered in the kernel are the same as the memory amounts occupied by the conventional device driver. Regarding this point, the device driver according to the embodiments of the present invention has no disadvantage compared with the conventional device driver.

The conventional device driver generally does not require the read processing of the scenario sequence file, and thus, it can be an additional processing. However, since recent personal computer or smartphone, etc. includes a microprocessor unit whose processing capability is high and an enough memory available, the processing (registration in the kernel) can be completed within the time required by the device even if the number of dispatches is increased somewhat. Accordingly, no particular performance concern is raised by the read processing of the scenario sequence file.

Furthermore, commands described in the scenario sequence file include the contents and the order of the functions called, but each function is integrated into components. Accordingly, a set of functions can be specified as a macro to enhance usability.

The speed of read processing of the scenario sequence file mainly relates to the time required for the dispatch of functions called from the scenario sequence file. A macro where a lot of commands are incorporated achieves quick processing, but impairs the versatility and thus causes difficulties in use. To the contrary, when a frequently used command, such as "memory transfer," is used, the number of dispatches is increased. If a microprocessor unit whose processing capability is low is used, it may fall into errors without completing the recognition of the device within the time required by the device and thus attention is required. Consequently, the macro should be designed appropriately, considering the number of the dispatches permitted from processing capability, etc. of the microprocessor unit, and the versatility of the scenario sequence file.

Typically, processing of protocol packets, etc. can be macro-sequenced easily, but it is considered rather inefficient to macro-sequence some of the processing, such as processing, which is bus-connected and includes a plurality of interruption processing. In many case, the processing specified as a macro in easy-to-use unit enhances a usability of the scenario sequence file.

Figure 2:
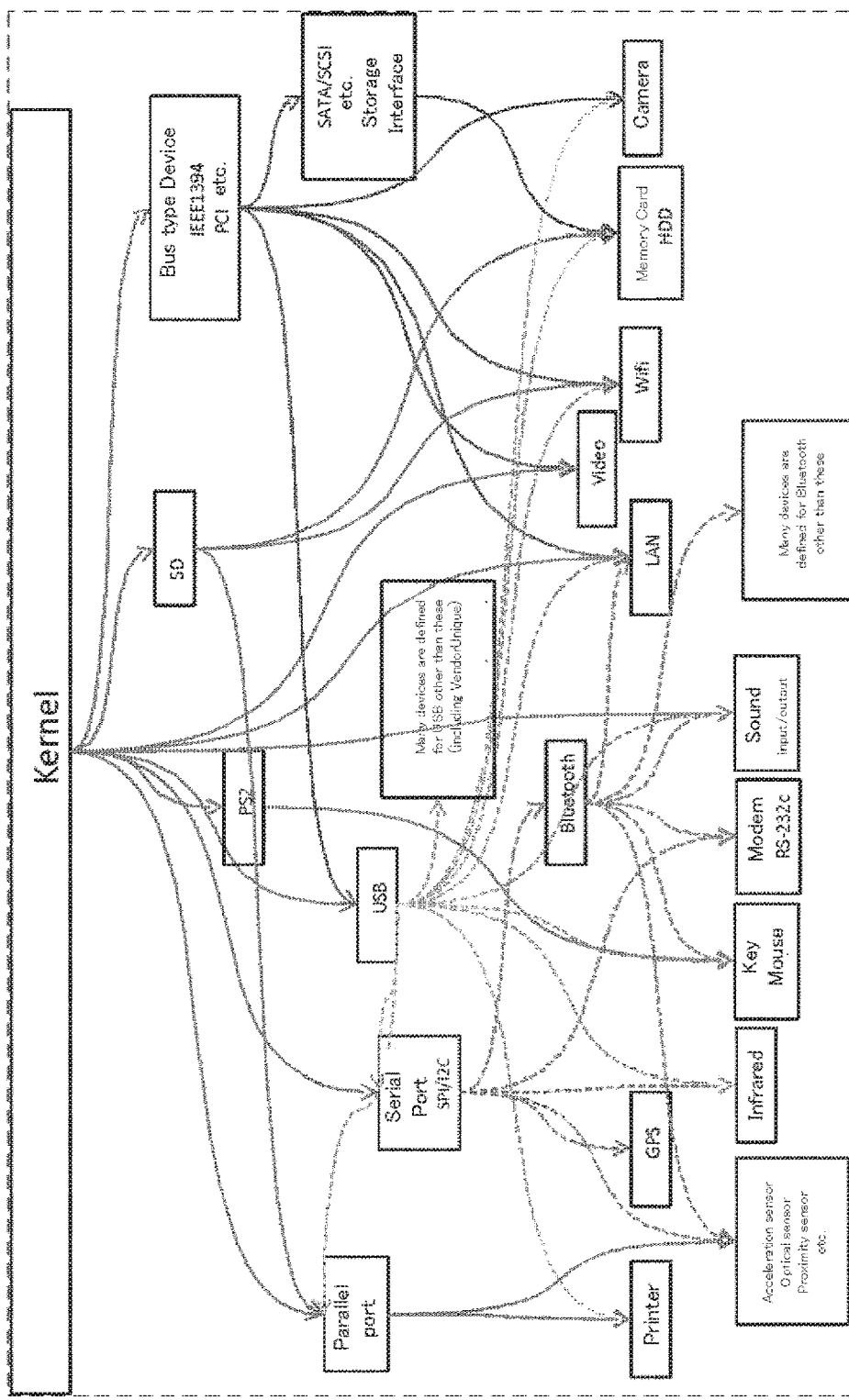
FIG. 2 is a chart showing a physical or logical connection condition between the kernel and devices, and between devices.

FIG. 2 is a chart showing a physical or logical connection condition between the kernel and devices, and the physical or logical connection condition between devices. In the chart, the solid lines represent physical bus interface connections and the dashed lines represent logical interface connections. For example, the kernel and USB host controller are bus-connected, but the USB device connected to USB host controller is connected via a logical interface communicated by protocol packet. For example, FIG. 2 represents that SD host device is connected to the kernel via an external bus, such as PCI bus, and, at the further end of SD host device, wireless communication devices, such as WiFi (wireless LAN) module, or memory card, etc. can be connected via the external bus called "SD bus (or SDIO bus maintaining backward compatibility)."

As described above, the notification driver is loaded into the kernel, and the device registration method to the kernel (the device setting-information) is provided to the kernel during the initialization of the device. Consequently, whatever device-interface the device includes, the device-driver corresponding to the device can be provided.

(Second Embodiment)—Registration Method of Device-Driver

Figure 3:
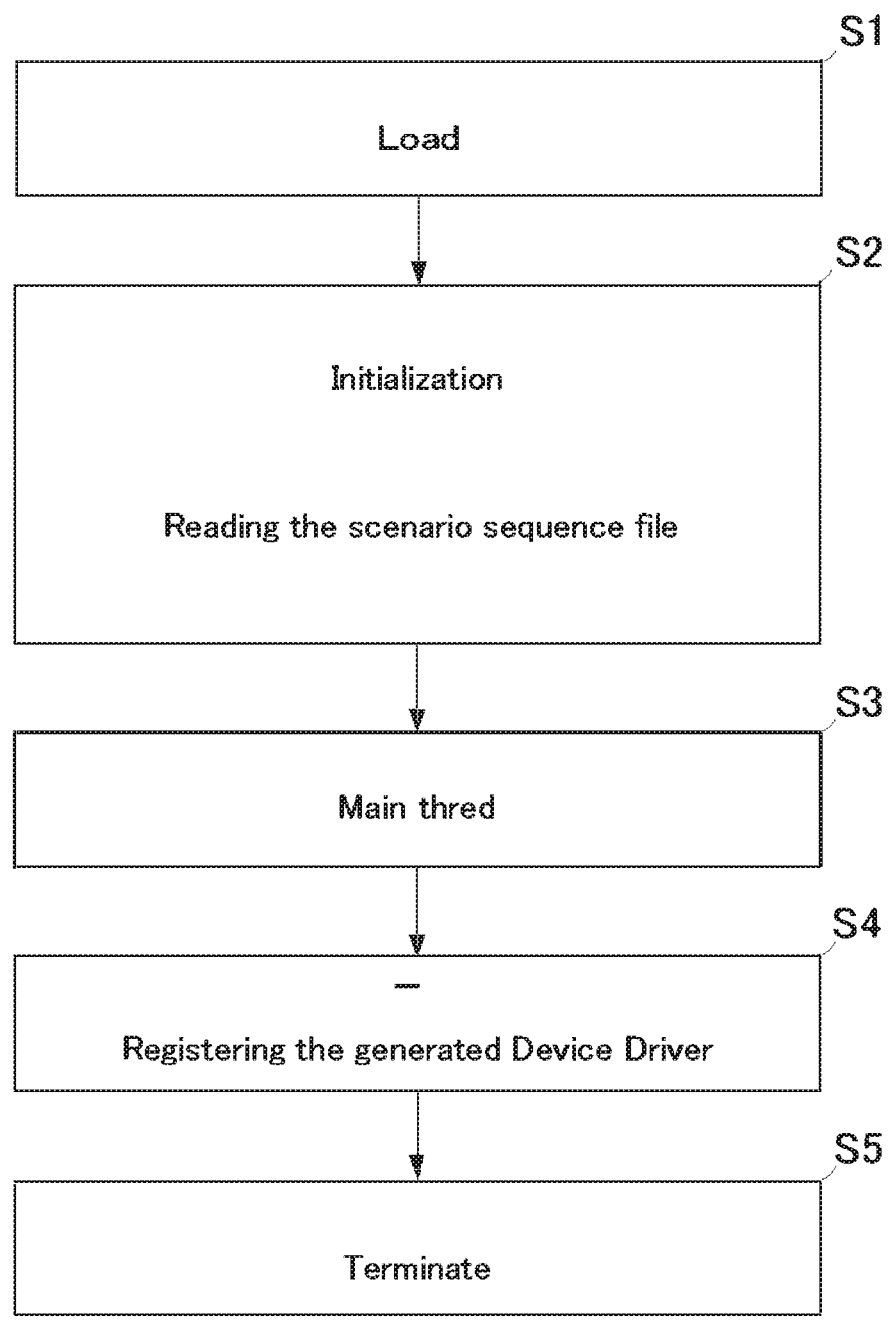
FIG. 3 is a flow chart showing a registration method of the device-driver.

FIG. 3 is a flow chart showing a registration method of a device-driver in the Second Embodiment.

—Step S1—

In Step S1, the notification driver described in the First Embodiment is loaded into the kernel. The method for loading the device-driver after OS-boot is OS-dependent. For example, when the OS is Linux®, a command "insmod", etc. may be used. When the OS is Windows®, a method for registering required device setting-information to the registry, by creating a driver definition file called ".sys", and making the OS read the device-driver in a plug-and-play, is simple. If other OS has any commands for loading the device-driver into the kernel, those commands may be used. This step is typically executed with administrator rights or set to be automatically executed with administrator rights on boot, but this step can be also changed so that it can be executed with user-rights.

—Step S2—

In Step S1, loading the notification drvier is completed and the device is in standby state. Subsequently, the initialization of the device is started (Step S2), and the scenario sequence file is read in.

Specifically, examples of this initialization step include setting the device's setting-information (parameter) to an initial value, initializing the execution commands described in the execution script that determines a device's operation, and securing operation areas on a memory for preparing for generating the device-driver based on the scenario sequence file.

For this initialization step, the following are examples of each operation for both the device and the kernel, in particular.

S2-1. Setting Default Values of the Register <OUT Side (Device Side)>

The registers of a sensor on OUT side are set to initial values. If the device is a camera module, various device parameters, such as a screen size for a camera, point where the focusing is started from (generally ∞), white balance (image tone), and exposure time, are set to initial values. The camera module is just an example, and it means that the setting values of various devices are set to initial values.

S2-2. Clearing the Work Memory (Work Memory is Zero-Padded) <IN Side>

The above step constantly assures the same operation if the device-driver is registered into the kernel.

The initialization is completed by reading the scenario sequence file.

—Step S3—

Subsequently, a main thread is executed (Step S3) where a handler is generated based on the scenario sequence file. This Step S3 includes steps for generating some functions and sequences, and more particularly, functions and sequences for read, write, and I/O control, and can be executed with user rights. For example, it means that the user can change a writing attribute in a file using I/O control. These steps determine an operation of the device-driver.

—Step S4—

Subsequently, a device-driver is registered in the kernel by registering the above each handler generated (Step S4). This device-driver requires just to be registered in an available state in the OS, and just to be included in the OS kernel irrespective of the method or utility form, etc.

Accordingly, the notification driver cannot start functioning as a device-driver, simply by loading the notification driver into the kernel. (Step S1). At least one handler is generated by initialization of the device and reading of the scenario sequence file, each handler is registered in the kernel (Step S4), and then notification driver finally starts functioning as a device-driver for the first time. Needless to say, the operation of a device-driver according to the embodiments is the same as the operation of a conventional device-driver when observed from the device-side.

In the above Steps S1 to S4, a device-driver 10 not dependent on the OS can be generated by reading device setting-information described in the scenario sequence file (the execution script that determines a device parameter and a device operation), and then the device connected to an interface can be controlled and used by using the device driver 10. Since the device-driver 10 does not require to be compiled (the conventional device-driver requires to be compiled), the device-driver 10 can be generated easily.

Step S5

When the device is removed, the programs, which are operating on the kernel, are terminated. [0051]

Third Embodiment

Figure 4:
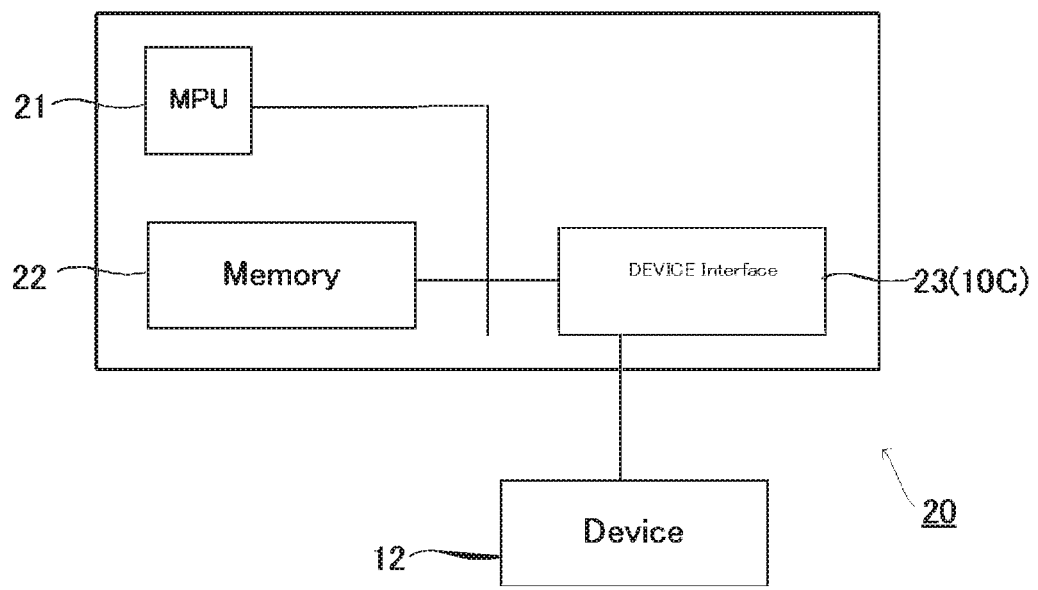
FIG. 4 is a schematic diagram showing a basic configuration of a computer.

FIG. 4 is a schematic diagram showing a basic configuration of a computer 20. The computer 20 includes a microprocessor unit 21, a memory 22, and a device-interface 23 (10C in FIG. 1). A CPU (Central Processing Unit), or various logic ICs, such as FPGA (field-programmable gate array) and a microcomputer, may be used as the microprocessor unit 21. The memory 22 refers to a temporary storage, such as RAM (Random Access Memory).

The device-interface 23 may be any one for peripheral equipment, which the microprocessor unit 21 controls, or more specifically, any one which can connect to the various devices as shown in FIG. 2. Examples of the device-interface 23 include a PCI (Peripheral Component Interconnect) card, a network card, a microphone, a camera, a USB, an SD card, a device incorporating WiFi (Wireless Fidelity), ADC (Analog to Digital Converter), a device incorporating Bluetooth®, a device incorporating GPS, a printer, FAX, and a scanner. The device-interface 23 may be any interface for connecting a temporal storage device (memory 22, etc.) or a storage device (hard disk, etc.), or may be an input interface for connecting a keyboard or a mouse, or an output interface for connecting a display device, such as a display. Additionally, since the memory 22 may also be peripheral equipment, for example, the memory 22 is connected to a memory slot (a device-interface (not shown in FIGs.)) and the microprocessor unit 21 manages the memory 22 by using a device-driver for memory 22.

The OS is installed in the computer 20, and additionally, the device-driver 10 generated by the above Steps S1 to S5 is registered in the OS kernel. The device 12 is then connected downstream of the device-interface 23 of the computer 20.

The driver-interface 10A shown in FIG. 1 is configured by each handler for the OS. The driver 10 plays the role of transmitting and receiving data between the driver-interface 10A (each handler) and the device-interface 10C (determined for each device). In particular, the driver 10 (10B) is a program for processing each handler. The processing of each handler has been determined in the above Step S3.

The above device-driver 10 is generated based on the scenario sequence file, so that the computer 20 can transmit and receive communication data to/from the device 12.

(Examples) Specific Example of the Scenario Sequence File

The following is an example of the scenario sequence file where the device setting-information is described.

Since the scenario sequence file is a file where an execution script for generating a device parameter and a handler of a device connected with the device-interface is described, and the scenario sequence file is a script format file, the scenario sequence file may be constituted of text data having such a very small-sized file (for example 2 byte or less) to be editable with editors. By means of implementation, it can be described in an intermediate language format, such as JavaScript® and XML, not depending on the OS or hardware (MPU) in a computer.

Information required to register the device into the kernel is:

(a) information about the device-interface;
(b) information about operation content of the device; and
(c) information about the device of connection destination.

This information should be described in the scenario sequence file, and registered into the kernel via the notification driver.

Even if minor change occurs in the configuration information of the device, the source code of the device-driver need be neither rewritten nor recompiled again unlike the conventional manner. It is only necessary to rewrite a part of the scenario sequence file and initialize the device again.

Some devices, such as a printer, can accept a plurality of kinds of connection forms. If the printer connectable to a network can be connected with a USB connection or a serial connection, the configurations of the driver-interface and the device-driver body are the same but only the driver-interface is different. Once the topologies are determined, then they will not be changed. Consequently the device-interface to be implemented may be determined just before the implementation. If it is desired to change the topology from a USB connection to a network connection (such as an Ethernet® connection), while the OS is started and the device-driver is not closed as well, the device is initialized again and the scenario sequence file whose device-interface is altered to indicate that the path information has been changed is required to just be read in via the notification driver.

Examples of the device setting-information (command and parameter, etc.) defined in the scenario sequence file included Processing Instruction Definitions (described below), Date definitions (described below), and the like.

[Processing Instruction Definition]

As is described below, a Processing Instruction Definition may define one or more scenarios and one or more corresponding execution commands to be executed in event of the defined scenario. Additionally, an a pre-determined, device-dependent interruption number may be processed as a reserved word, such as "int1".

Processing Instruction: Processing Content
wait intr(n): Wait for an interruption of interruption ID n.
write $addr: Write the data received from the OS into $addr
write $addr,size: Write the data received from the OS from $addr
write data,$addr: Write the data into $addr
read $addr,size: Return the data containing only "size" from $addr to the OS
copy $add1,$add2,size: Transfer "size" byte data from $add1 to $add2
copy $add1,$add2,size: Transfer "size" byte data from $add1 to $add2
copy #dataset(n): Transfer Data set ID n
res data: Return the data to the OS
and mask,$addr: AND data in $addr and "mask", and Reflect it to a conditional branch expression
or mask,$addr: OR data in $addr and "mask", and Reflect it to a conditional branch expression
if else endif: a condition branch of the scenario
while endwhile: Execute repeatedly from "while" to "endwhile" until some condition occurs
for n endfor: Execute from "for" to "endfor" n times
exit: Terminate the interface In addition to those mentioned above, other processing instructions, such as a synchronism mechanism including DMA transfer or "mutex", etc., may also be described in the Processing Instruction Definition.

[Data Set Definition]

As is described below, a Data Set Definition may define one or more data sets. A data set may be defined by a data column having freely-selected name. A data column may identify a register and describe some type of definition content, such as the timing after writing to the identified register or the like.

Data Set Definition: Definition Content
b $addr and mask n: Define a data set b as a data column "Write AND of "mask" into the content of $addr for one-byte, and Wait for n milliseconds"
w $addr or mask n: Define a data set w as a data column "Write OR of "mask" into the content of $addr for two-byte, and Wait for n milliseconds"
l $addr data n: Define a data set l as a data column "Write "data" into the content of $addr for four-byte, and Wait for n milliseconds"

Subsequently, the following is an example of the device-driver that allocates the execution script including device parameters, processing instruction definitions, and data set definitions to each handler of the OS ([init], [term], [open], [close], [I/O-ctrl], [read], [write], [main_thread]) based on the scenario sequence file, and that constitutes the processing of each handler. Using this device-driver allows controlling reading/writing of an acceleration sensor from/into the memory mapped register. The acceleration sensor is an example of a device that transmits and receives predetermined-sized packets at arbitrary timing. "//" indicates comments in some of the following.

```
[init]
    allocate $buffer 16;
    allocate $flag 1;
    exit;
[term]
    free buffer;
    free $flag;
    exit;
[open] // Do Nothing
    exit;
[close] // Do Nothing
    exit;
[I/O-ctrl] // Do Nothing
    exit;
[read]
    or.w #0001,$flag;
    if // If Buffer includes any Data
```

```
        read $recive_data, 16; // Read Data
        write.w 1,$flag
        endif
        exit;
[write]
        write $send_reg,16; // Start reading Device
        wait int1; // Wait for Completion Interruption
        exit;
[main_thread] // Wait for Reception Interruption and Write into Buffer
        while;
        wait int1; // Wait for Completion Interruption
        read $recive_data,buffer,16; // Write Data into Buffer from
        Device
        write.w 1,$flag;
        endwhile;
```

The instructions above describe a relatively simple program. The scenario (order of the instructions) is described in the scenario sequence file with a text editor, and the processing content described (for example, one having a look-up table) is allocated as a callback handler to each interface (six types) by parsing the scenario, so that the function as a device-driver is determined. Ways to read the scenario sequence file include using some functions, such as "Open", "Read", "Write", and "Close". If an interruption occurs, "Interruption Waiting" is executed.

If a third party, such as a user who is not the device maker, creates (or changes) a scenario sequence file by acquiring parameters required for setting device, the change of the scenario script content itself may cause a malfunction of the driver operation. Consequently, in this case, some measures can be taken to prevent the changing of settings unnecessarily, for example by making users create and change the scenario sequence file with an application tool other than the text editor.

Fourth Embodiment

Figure 5:
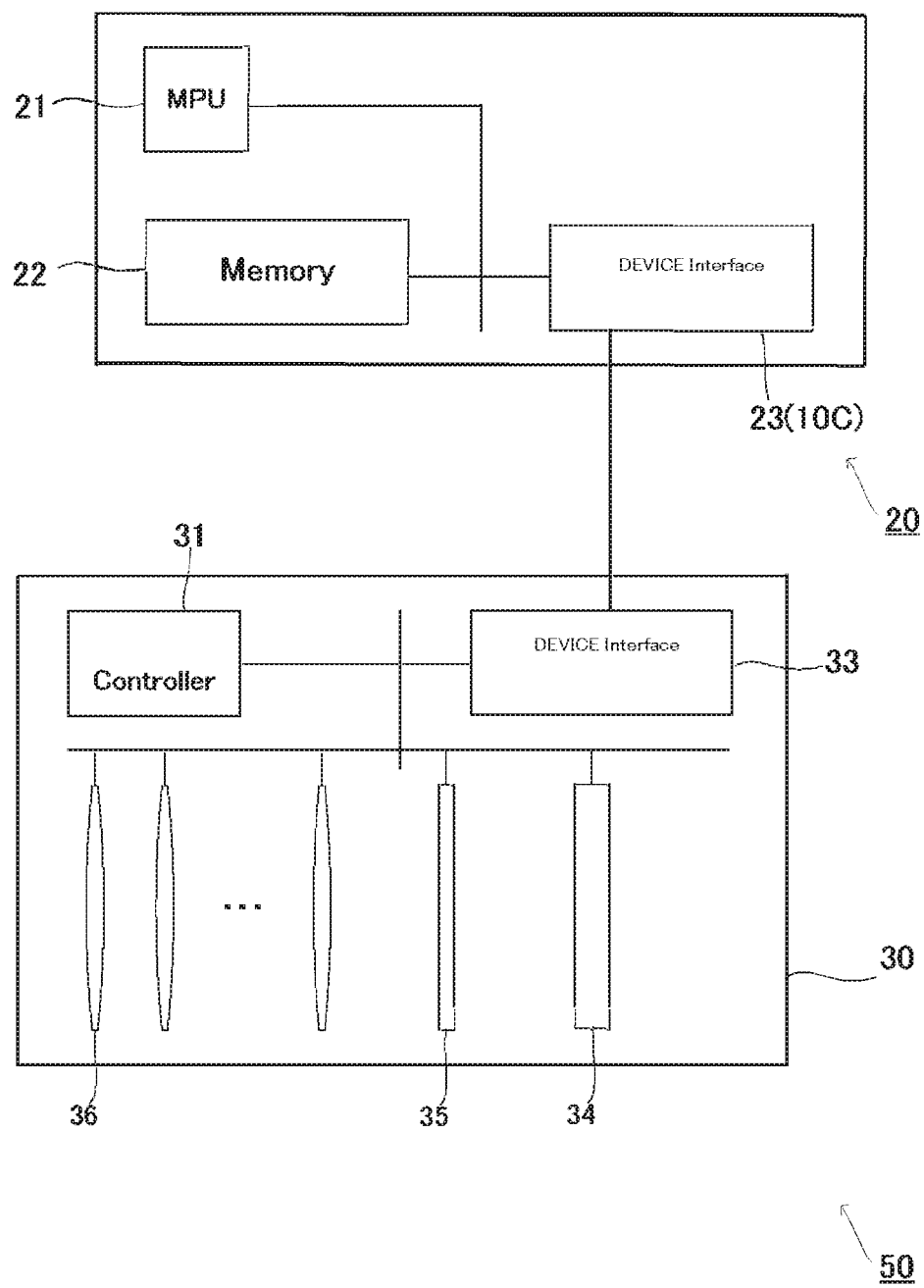
FIG. 5 is a block diagram showing a camera module.

FIG. 5 is a block diagram showing a camera module. As shown in FIG. 5, a camera body 50 includes a computer 20 and a camera module 30. The camera module 30 includes a controller 31, a device-interface 33, a sensor 34, and optical system components, such as an IR filter 35 a lens 36. Between the computer 20 and the camera module 30, device-interfaces 23 and 33 are bus-connected.

The controller 31 of the camera module controls each part of the camera module, by using signals from the computer 20 or other external input. A camera body 50 also includes a display or a touch-panel (not shown in FIGs.), and the display or the touch-panel displays a settings screen corresponding to the camera module 30, or still or moving images taken by the camera body 50. Additionally, the camera body 50 may also include a memory or interfaces corresponding to other devices.

The computer 20 is required to change how to control the camera body 50 depending on the purpose. The camera body 50 needs many setting values for capturing still images, capturing moving images, setting resolution, or setting sensitivity. For processing each captured image, various adjustments, such as adjusting an image quality, are also required. Since some optical devices, such as this type of camera module, may need more than 1,000 device parameters that can be adjusted, the operation requires technical knowledge. In such cases, generation of the device-driver without compilation leads to remarkably improving development efficiency.

Furthermore, it is also remarkable that users can change device setting-information defined inside a device-driver even after the device-driver has been produced. For example, when a certain lens is sold, the scenario sequence file including parameters for setting white balance, exposure, focus, etc., which enables photographing with enhanced perspective, is delivered to a user together with the lens. The present embodiments allow the user to update the new device setting-information without compiling the device-driver, to use a camera attached with the above lens, and also to change the setting values.

It is clear that, although the embodiments of the present invention have been described with reference to the camera module, this is one example of a device that needs many setting parameters and typically takes long time to develop the device-driver; however any device whose device-driver is registered to the kernel when the device is used (all devices connected via USB (Universal Serial Bus), device connected via parallel port or serial port, device connected via SD bus, bus type device via PCI bus or IEEE1394, etc. (including both of internal bus and external bus)) can be a "device" in the context of the present embodiments.

REFERENCE SIGNS LIST 10 device-driver
10A driver-interface
10B device body
10C device-interface
11 kernel
12 device
20 computer
21 microprocessor unit (MPU)
22 memory
23 device-interface
30 camera module
31 controller
33 device-interface
34 sensor
35 IR filter
36 lens
50 camera body

The invention claimed is:

1. A device-driver registration device comprising:
a notification driver, wherein the notification driver is provided with a driver-interface for notifying an OS kernel of device setting-information, the notification driver not including any device configuration information; and
a scenario sequence file, in which only device setting-information not depending on an operating system is described,
wherein the device setting-information is registered into the kernel via the driver-interface by reading the scenario sequence file into the notification driver.

2. The device-driver registration device according to claim 1, wherein the notification driver is compiled according to the OS kernel.

3. A device driver registration method comprising:
preparing a notification driver and a scenario sequence file, wherein the notification driver comprises a driver-interface for notifying an OS kernel of device setting-information, wherein the notification driver does not include any device configuration information, and wherein the scenario sequence file describes only device setting-information not depending on an operating system, and registering the device setting-information into the kernel via the driver-interface by reading the scenario sequence file into the notification driver.

4. The registration method of the device-driver according to claim 3, wherein the notification driver only functions as an interface to notify the OS of the device setting-information.

5. The device driver registration method according to claim 3, wherein preparing the notification driver comprises compiling the notification driver according to the OS kernel.

6. A registration method of a device-driver comprising:
loading a notification driver into an OS kernel,
wherein the notification driver comprises a driver-interface for notifying the OS kernel of device setting-information, the notification driver not including any device configuration information;
starting initializing a device and reading a scenario sequence file where the device setting-information is described;
executing a main thread to generate a handler based on the scenario sequence file; and
registering a device-driver into the kernel by registering the handler, thereby allowing the scenario sequence file to not depend on the OS kernel.

7. The registration method according to claim 6, wherein initializing the device and reading the scenario sequence file where the device setting-information is described comprises:
setting default values of a register; and
clearing a work memory.

8. The registration method according to claim 6, wherein executing the main thread to generate the handler based on the scenario sequence file comprises respectively associating a device parameter and an execution script that determines a device operation to every handler according to a table.

9. The registration method of the device-driver according to claim 6, wherein loading the notification driver into the OS kernel comprises compiling the notification driver according to the OS kernel and loading the compiled notification driver into the OS kernel.

* * * * *